United States Patent
Ota et al.

(10) Patent No.: US 9,381,789 B2
(45) Date of Patent: Jul. 5, 2016

(54) HEATER APPARATUS

(71) Applicant: DENSO CORPORATION, Kariya, Aichi-pref. (JP)

(72) Inventors: Koji Ota, Kariya (JP); Takuya Kataoka, Okazaki (JP); Manabu Maeda, Nagoya (JP); Asami Okamoto, Kariya (JP); Yasuhiro Sagou, Chiryu (JP); Keita Saitou, Chita-gun (JP); Yoshihiko Shiraishi, Nagoya (JP); Toshihisa Taniguchi, Handa (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 0 days.

(21) Appl. No.: 14/778,637

(22) PCT Filed: Jan. 23, 2014

(86) PCT No.: PCT/JP2014/000332
§ 371 (c)(1),
(2) Date: Sep. 21, 2015

(87) PCT Pub. No.: WO2014/155915
PCT Pub. Date: Oct. 2, 2014

(65) Prior Publication Data
US 2016/0039265 A1    Feb. 11, 2016

(30) Foreign Application Priority Data

Mar. 28, 2013  (JP) ................. 2013-069337

(51) Int. Cl.
| | |
|---|---|
| *F24D 19/02* | (2006.01) |
| *H05B 3/20* | (2006.01) |
| *G06F 3/044* | (2006.01) |
| *B60H 1/00* | (2006.01) |
| *F24C 7/04* | (2006.01) |
| *H05B 3/12* | (2006.01) |
| *H05B 3/26* | (2006.01) |
| *B60H 1/22* | (2006.01) |

(52) U.S. Cl.
CPC ........ *B60H 1/00742* (2013.01); *B60H 1/00878* (2013.01); *B60H 1/2215* (2013.01);
(Continued)

(58) Field of Classification Search
None
See application file for complete search history.

(56) References Cited

U.S. PATENT DOCUMENTS

| 2010/0096379 A1 | 4/2010 | Asami et al. |
| 2012/0061365 A1 | 3/2012 | Okamoto et al. |

(Continued)

FOREIGN PATENT DOCUMENTS

| JP | S62156703 U | 10/1987 |
| JP | S63127032 A | 5/1988 |

(Continued)

OTHER PUBLICATIONS

International Search Report and Written Opinion (in Japanese with English Translation) for PCT/JP2014/000332, mailed Feb. 25, 2014; ISA/JP.

*Primary Examiner* — Thor Campbell
(74) *Attorney, Agent, or Firm* — Harness, Dickey & Pierce, P.L.C.

(57) ABSTRACT

A heater apparatus includes a main body, a detecting unit, and a control part. The main body has a power supply part to which electric power is supplied and a heating portion connected to the power supply part to generate heat by electric power supplied from the power supply part. The detecting unit detects an object around the main body. The control part controls supply amount of the electric power to the power supply part. The control part controls the supply amount of electric power to the power supply part to be reduced compared with a normal state when the detecting unit detects that the object is within a predetermined range of the main body.

5 Claims, 5 Drawing Sheets

(52) U.S. Cl.
CPC ............... *B60H1/2218* (2013.01); *F24C 7/04* (2013.01); *H05B 3/12* (2013.01); *H05B 3/267* (2013.01); *H05B 2203/012* (2013.01); *H05B 2203/032* (2013.01)

(56) References Cited

U.S. PATENT DOCUMENTS

| | | |
|---|---|---|
| 2012/0118872 A1 | 5/2012 | Kanba et al. |
| 2012/0234932 A1 | 9/2012 | Okamoto et al. |
| 2012/0267354 A1 | 10/2012 | Okamoto et al. |
| 2015/0110477 A1 | 4/2015 | Ota et al. |

FOREIGN PATENT DOCUMENTS

| | | |
|---|---|---|
| JP | 2005135692 A | 5/2005 |
| JP | 2008018057 A | 1/2008 |
| JP | 2008285145 A | 11/2008 |
| JP | 2010156993 A | 7/2010 |
| JP | 2011153746 A | 8/2011 |
| JP | 2012035844 A | 2/2012 |
| JP | 2012056531 A | 3/2012 |
| JP | 2012192827 A | 10/2012 |
| JP | 2012228896 A | 11/2012 |

HEATER APPARATUS

CROSS REFERENCE TO RELATED APPLICATIONS

This application is a U.S. National Phase Application under 35 U.S.C. 371 of International Application No. PCT/JP2014/000332 filed on Jan. 23, 2014 and published in Japanese as WO 2014/155915 A1 on Oct. 2, 2014. This application is based on and claims the benefit of priority from Japanese Patent Application No. 2013-069337 filed on Mar. 28, 2013. The entire disclosures of all of the above applications are incorporated herein by reference.

TECHNICAL FIELD

The present disclosure relates to a heater apparatus.

BACKGROUND ART

Patent Literature 1 discloses a radiant heater apparatus. The radiant heater apparatus is arranged to oppose an occupant in an interior of a vehicle.

The radiant heater apparatus is effective as an equipment to provide an occupant with a feeling of warm, in order to assist an air-heating device for a vehicle. However, further improvement is required for a radiant heater apparatus.

PRIOR ART LITERATURES

Patent Literature

Patent Literature 1: JP 2012-56531 A

SUMMARY OF INVENTION

The present disclosure is aimed to provide a heater apparatus which can restrict excessive temperature rise in an object which approaches or is in contact with a heating portion.

According to an aspect of the present disclosure, a heater apparatus includes a detecting unit which detects an object around a main body, and a control part which controls electric power supplied to a power supply part. When it is detected by the detecting unit that an object is within a predetermined range of the main body, the control part controls the power supply part to reduce the amount of electric power supplied to the power supply part compared with a usual state.

Thereby, when an object is within the predetermined range of the main body, the heat emitting amount of the heating portion can be reduced compared with a usual state. In this way, the temperature of the adjacent object can be restricted from increasing by heat transmitted from the heating portion. Therefore, excessive temperature rise in the object can be restricted while the object approaches or is in contact with the heating portion.

DESCRIPTION OF EMBODIMENTS

Figure 1:
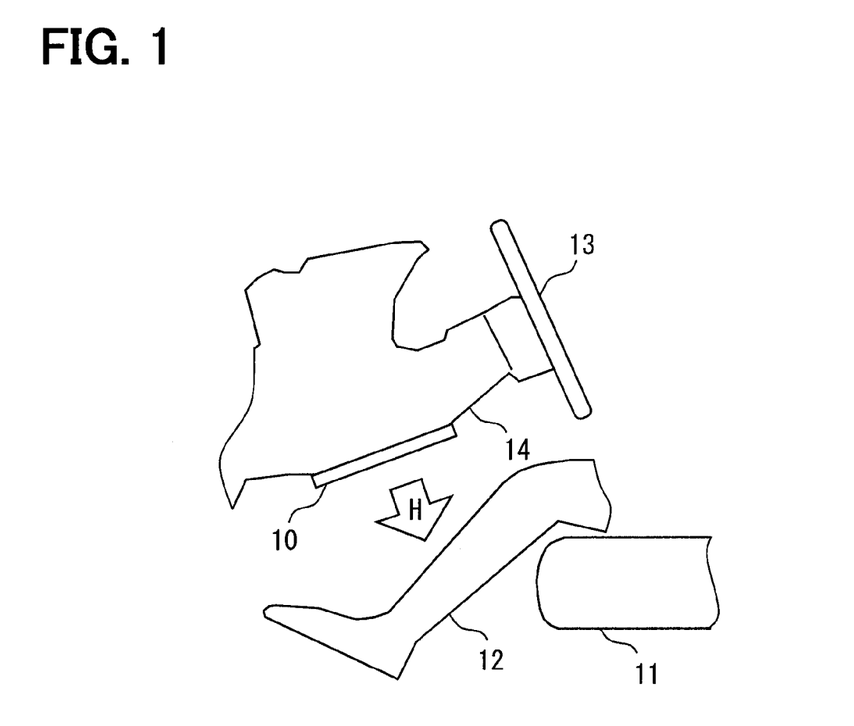
FIG. 1 is a side view showing a heater apparatus according to an embodiment.

In FIG. 1, a heater apparatus 10 according to an embodiment is installed in a mobile unit such as a vehicle that drives on a road, a vessel, and an airplane. The heater apparatus 10 corresponds to a part of a heater system for heating the interior. The heater apparatus 10 is an electric heater that emits heat by being supplied with electric power from a power source such as battery or generator mounted in the mobile unit. The heater apparatus 10 has a thin board shape. The heater apparatus 10 generates heat when electric power is supplied. The heater apparatus 10 radiates a radiant heat H mainly in a direction perpendicular to a surface of the heater apparatus 1 for the purpose of heating an object located in the direction perpendicular to the surface.

A seat 11 on which an occupant 12 is to be seated is installed in the interior. The heater apparatus 10 is installed to radiate the radiant heat H toward feet of the occupant 12. The heater apparatus 10 can be used as equipment for offering warmth immediately to the occupant 12, for example, immediately after starting the other heating equipment. The heater apparatus 10 is installed on a wall surface of the interior. The heater apparatus 10 is installed to face the occupant 21 with an expected normal posture. For example, a vehicle that drives on a road has a steering column 14 supporting a steering wheel 13. The heater apparatus 10 can be installed on a lower surface of the steering column 14 so as to oppose the occupant 21.

Figure 2:
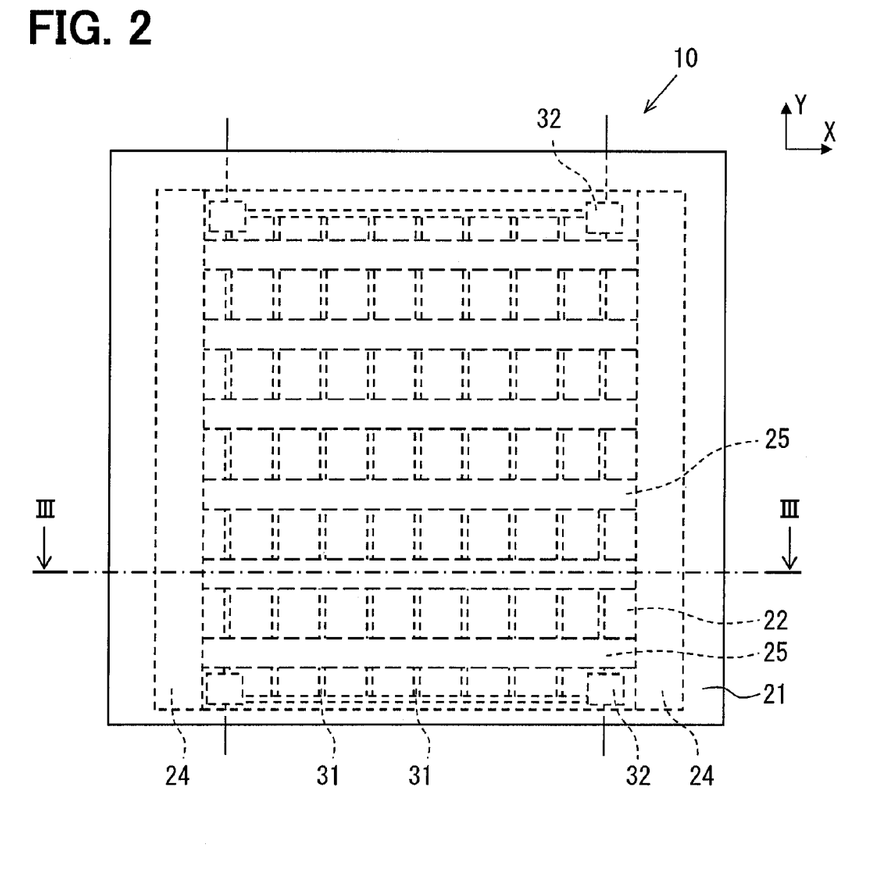
FIG. 2 is a bottom view of the heater apparatus.
Figure 3:
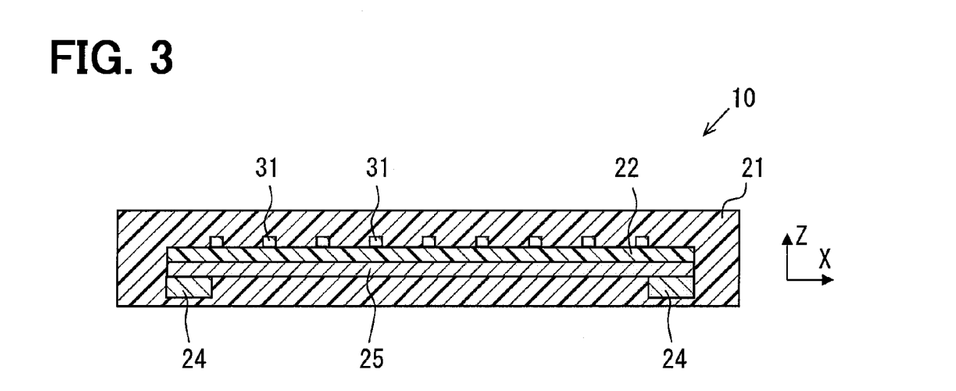
FIG. 3 is a cross-sectional view taken along a line III-III of FIG. 2.

Next, the configuration of the heater apparatus 10 is explained with reference to FIG. 2 and FIG. 3. In FIG. 2 and FIG. 3, the heater apparatus 10 spreads along the X-Y plane that is defined by the axis X and the axis Y. The heater apparatus 10 has a thickness in the direction of the axis Z. The heater apparatus 10 has an approximately square thin board shape. The heater apparatus 10 has a main body 21, an insulated board 22, a detecting unit 23, a power supply part 24, a heating portion 25, and a control part 26. The heater apparatus 10 can also be called as a surface heater which emits the radiant heat H mainly in a direction perpendicular to the surface.

The main body 21 has outstanding electrical insulation properties. The main body 21 is formed to surround each of the heating portions 25, and has a thermal conductivity lower than a thermal conductivity of the heating portion 25. The main body 21 has a plate shape, and the insulated board 22, the detecting unit 23, the power supply part 24, and the heating portion 25 are arranged inside of the main body 21.

The insulated board 22 is made of resin material having outstanding electrical insulation properties, and is able to bear high temperature. The surface 22a of the insulated board 22 faces in the radiation direction of the radiant heat H. In other words, the surface 22a located on one side of the insulated board 22 in the thickness direction is a surface arranged to oppose a part of the occupant 12 to be heated in the installation state of the heater apparatus 10. The back surface 22b located on the other side of the insulated board 22 in the thickness direction offers a back surface of the heater apparatus 10. The insulated board 22 supports the detecting unit 23 and the heating portion 25.

The heating portions 25 are connected to the power supply part 24, and generate heat with the electric power supplied from the power supply part 24. The heating portions 25 are dispersed and arranged on the back surface 22b of the insulated board 22. Each of the heating portions 25 is made of a material which has high thermal conductivity. Furthermore, the heating portion 25 is made of outstanding electric conductor, i.e., material with low electrical resistance. The heating portion 25 can be made of metal material. The heating portion 25 is chosen from materials having thermal conductivity lower than that of copper. For example, the heating portion 25 is made of an alloy of copper and tin (Cu—Sn), or metal such as silver, tin, stainless steel, nickel or nichrome and their alloy.

Each of the heating portions 25 has a thin board shape parallel to the surface of the insulated board 22. The heating portion 25 is able to emit the radiant heat H, due to the heat supplied through the electric power. The heating portion 25 can emit the radiant heat H to make the occupant 12, i.e., a person to feel warm, when being heated to have a predetermined radiation temperature. The heating portion 25 has a rectangle shape prolonged in the axis X in the X-Y plane. The material and the cross-sectional size of the heating portion 25 are defined so that heat resistance in the direction of the axis X becomes lower than or equal to a predetermined value.

The heating portions 25 are arranged on the back surface 22b of the insulated board 22 not to overlap with each other. The heating portions 25 are arranged to separate from each other in the direction of the axis Y. The heating portions 25 are regularly arranged to occupy a predetermined area on the X-Y plane in the drawing.

As shown in FIG. 2, a pair of power supply parts 24 has a rectangle shape prolonged in the direction of the axis Y, and are arranged to be in contact with the respective ends of the heating portions 25 in the axis X so that energization is possible respectively. Therefore, the heating portions 25 are connected in parallel with each other relative to the power supply part 24. A predetermined voltage is impressed to the both ends of the power supply part 24 in the axis Y. Electric power is supplied from an external power source to the power supply part 24, and the power supply part 24 supplies the electric power to the heating portion 25. The electric resistivity of the power supply part 24 is set to be smaller than the electric resistivity of the heating portion 25. The power supply part 24 is made of, for example, copper. The cross-section area of the heating portion 25 is set to be smaller than the cross-section area of the power supply part 24. Thereby, generation of heat is controlled while large current flows through the power supply part 24.

The detecting unit 23 detects an object around the main body 21. In this embodiment, the detecting unit 23 detects an object to be in a predetermined range of the heating portion 25 by detecting change in electric capacitance that is caused when the object approaches the heating portion 25. The detecting unit 23 is configured to be able to communicate with the control part 26. When the detecting unit 23 detects that an object is within the predetermined range of the heating portion 25, the detecting unit 23 sends the detection signal to the control part 26.

The detecting unit 23 detects that the object is in contact with the surface of the main body 21 and that the object approaches the surface of the main body 21. The detecting unit 23 has plural conductive parts 31 as electrode for detecting change in electric capacitance. The conductive part 31 has conductivity, and is made of, for example, copper. The conductive parts 31 are dispersed and arranged on the surface 22a of the insulated board 22. The detecting unit 23 and the heating portion 25 are arranged inside the main body 21. Moreover, the heating portion 25 and the conductive part 31 are insulated from each other by the insulated board 22.

The conductive parts 31 are arranged on the surface 22a of the insulated board 22 not to overlap with each other. The conductive parts 31 are arranged to separate from each other. Among the conductive parts 31, a pair of conductive parts 31 extends in the direction of the axis X, and has a clearance in the direction of the axis Y. The other plural conductive parts 31 extend in the direction of the axis Y, and have clearance in the direction of the axis X. The both ends of the other conductive parts are connected to the pair of conductive parts 31. Thus, the conductive parts 31 are arranged to have the vertically striped pattern in which the end in the direction of the axis Y is connected. Moreover, the cross-section area of the conductive part 31 is set to be smaller than the cross-section area of the power supply part 24.

The electrode 32 is formed at the four corners of the conductive part 31 in the X-Y plane. Electric power is impressed to the electrode 32, and current flows in the conductive part 31. When current flows in the conductive part 31, uniform low-voltage electric field is generated around the main body 21. When an object approaches the main body 21, the electric capacitance of the electrode 32 changes. The control part 26 converts this change into an electric signal, and can detect approach of the object. Therefore, the detecting unit 23 detects the change in electric capacitance through the energy field that is electric filed, and detects existence of an object in non-contact state.

Figure 4:
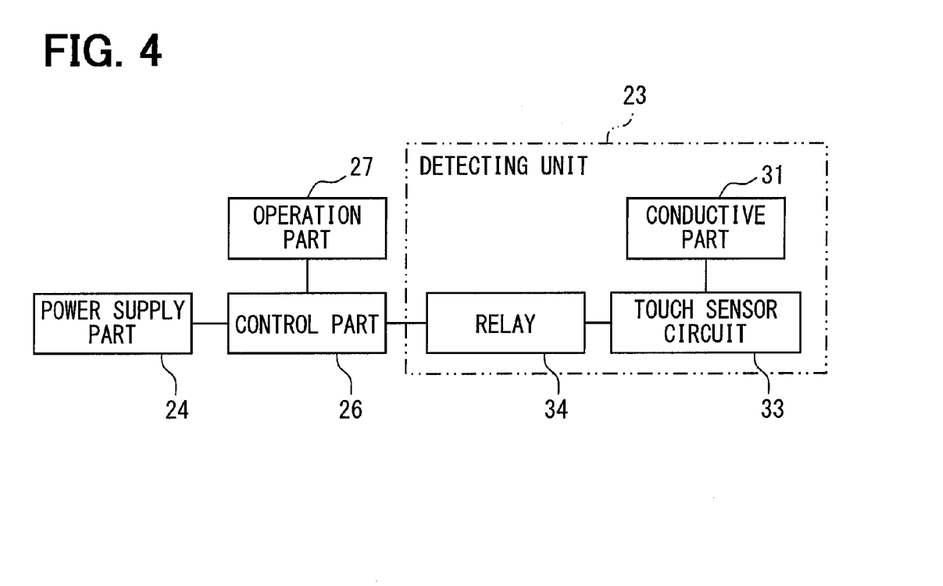
FIG. 4 is a block diagram illustrating an electric configuration of the heater apparatus.

As shown in FIG. 4, the control part 26 is electrically connected to the power supply part 24, the operation part 27, and the detecting unit 23. The operation part 27 is equipped with a switch for operating the heater apparatus 10. The operation part 27 may be common as the operation switch of an air-conditioner for a vehicle. When a user operates the operation part 27, ON/OFF of the power supply of the heater apparatus 10 and a setup of preset temperature can be performed. When the operation part 27 is operated, the operation information is transmitted to the control part 26.

The detecting unit 23 includes the conductive part 31, the touch sensor circuit 33, and the relay 34. The conductive part 31 generates electric field as mentioned above. The touch sensor circuit 33 is connected with the conductive part 31 and detects change in the electric capacitance of the conductive part 31. The touch sensor circuit 33 is connected also to the relay 34. When change in electric capacitance is detected, the touch sensor circuit 33 converts the change into an electric signal, and controls the relay 34 from OFF to ON. Thus, the signal representing the change in electric capacitance is given to the control part 26 through the relay 34.

The control part 26 controls the electric power impressed to the power supply part 24. When the operation part 27 is operated, the control part 26 controls the electric power supplied to the power supply part 24 based on the operation information. For example, when the power supply is turned ON, the control part 26 controls the power supply part 24 to supply electric power. Moreover, the control part 26 determines that the object approaches or is in contact when a signal is transmitted from the detecting unit 23 as mentioned above.

Figure 5:
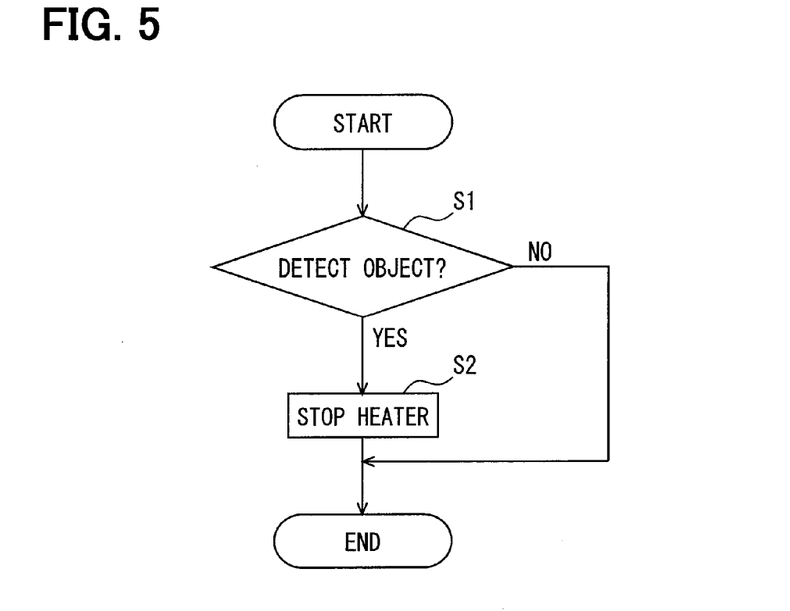
FIG. 5 is a flow chart showing a processing by a control part of the heater apparatus.

Next, a processing by the control part 26 is explained with reference to FIG. 5. The processing shown in FIG. 5 is repeatedly performed in the power-on state of the heater apparatus 10. At Step S1, it is determined whether an object is detected or not by the detecting unit 23. When an object is detected, the control part moves to Step S2. When not detected, this flow is ended. It is determined that the detecting unit 23 detects an object when the object is within the predetermined range of the main body 21, for example, when the object approaches or contacts. The approach means a state where the object is located at the position distanced from the surface of the main body 21 within the range of, for example, several centimeters.

Since the object is detected, the power supply to the power supply part 24 is controlled to stop at Step S2, and this flow is ended. When the power supply to the power supply part 24 is stopped, generation of heat by the heating portion 25 is stopped.

Thus, when the detecting unit 23 detects that an object is within the predetermined range of the main body 21, the control part 26 controls the amount of power supply to the power supply part 24 to be smaller than a usual state. In this embodiment, the control part 26 controls to stop the power supply from the power supply part 24. In other words, the control part 26 stops the electric power supply to the power supply part 24 when the change in electric capacitance becomes larger than or equal to a predetermined value. In the usual state, the amount of power supply is set based on, for example, a preset temperature set up by the user.

Next, the temperature change in the contact portion of the main body 21 when an object contacts the main body 21 is explained with reference to FIG. 6. In the graph shown in FIG. 6, over all the time zone, the electric power in the usual state is supplied to the power supply part 24. Therefore, even if an object contacts the main body 21, the heating portion 25 is energized in the usual state to generate heat. Moreover, in FIG. 6, the object in contact with the main body 21 corresponds to a tip end of one finger of a person.

Figure 6:
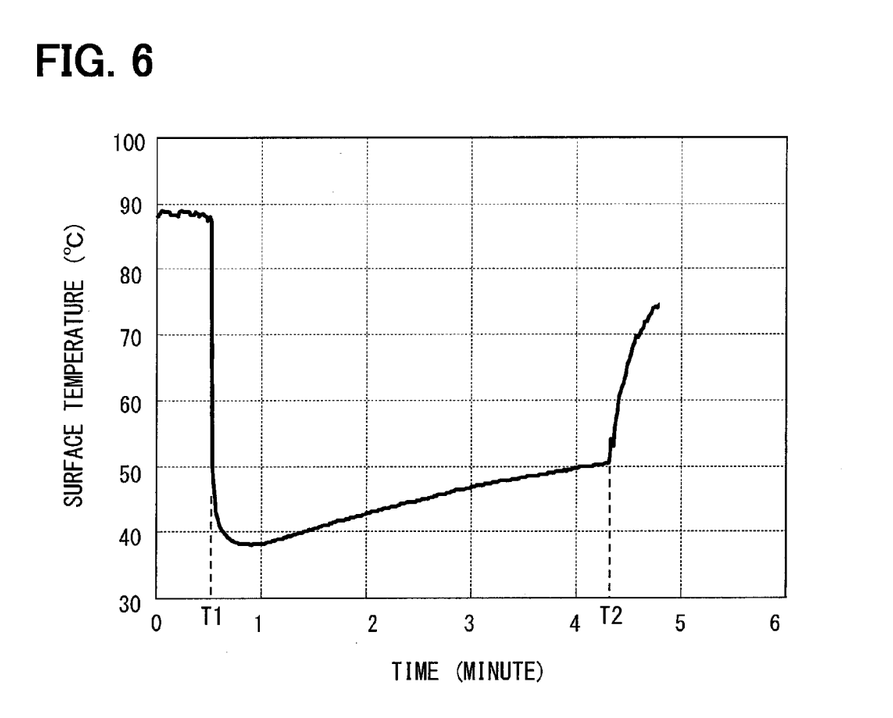
FIG. 6 is a graph illustrating a relationship between a time and a surface temperature of a main body of the heater apparatus.

In the state where the heater apparatus 10 is operating, at the time T1 (about 30 seconds) shown in FIG. 6, the tip end of the finger contacts the surface of the main body 21. Then, the temperature falls immediately from about 90 degrees to about 40 degrees. This is because the heat transfers from the contact portion to the finger at the moment when the finger contacts the main body 21. Since heat moves to the finger at the contact portion of the main body 21, other heat moves to the contact portion from the periphery of the main body 21. However, the heating portion 25 is narrow in the width, and the circumference of the heating portion 25 is covered with the main body 21. Therefore, heat is not easily transmitted from the heating portion 25 to the contact portion. Accordingly, while the finger touches from the time T1 to the time T2 (about 4 minutes and 20 seconds), a rise in the temperature is slow. When the finger is separated from the main body 21 at the time T2, the temperature rises for a short time.

As mentioned above, the control part 26 controls the power supply part 24 to stop the energization, when the detecting unit 23 detects an object within the predetermined range of the main body 21. Therefore, the electric power supply is stopped at least when an object contacts the main body 21. However, as shown in FIG. 6, when an object contacts the main body 21, the surface temperature is immediately lowered irrespective of the existence of electric power supply. Therefore, even if the main body 21 has high temperature, the temperature of the object does not become high at the contact timing. Since the electric power supply is stopped after that, the temperature of the object can be certainly prevented from becoming high even while the contact state continues. In other words, the heat transfer to the object can be prevented since the temperature of the contact portion of the main body 21 is decreased by turning off the energization.

Figure 7:
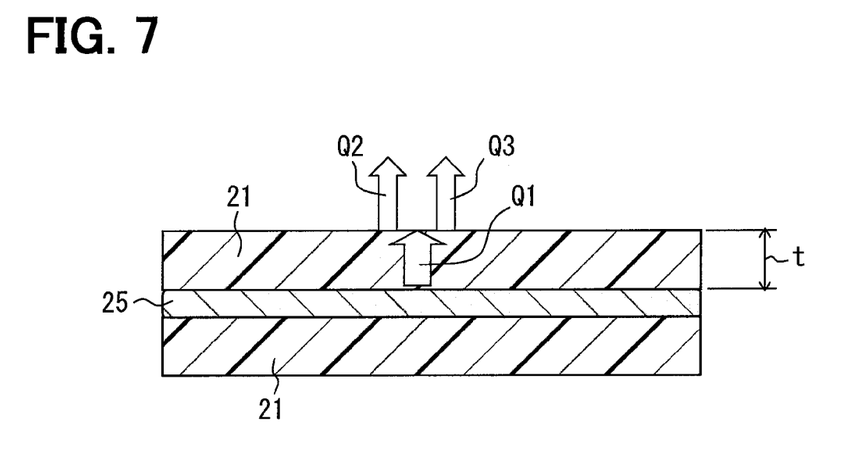
FIG. 7 is a schematic cross-sectional view showing the heater apparatus before an object contacts.
Figure 8:
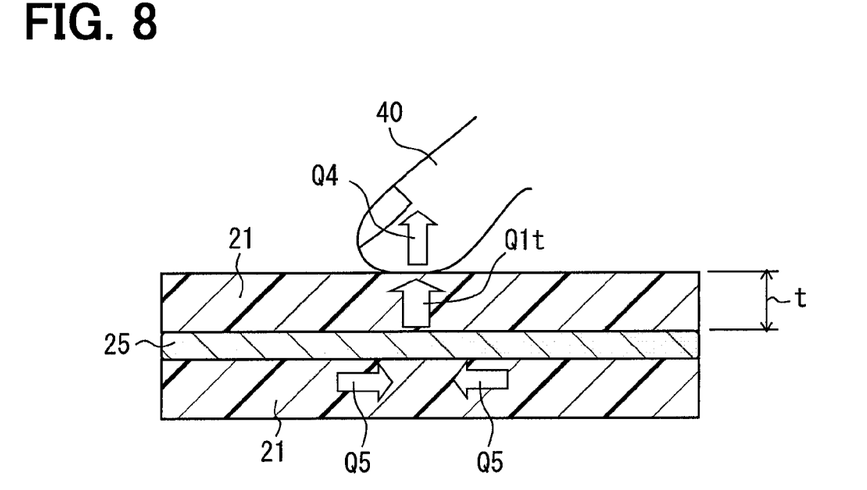
FIG. 8 is a schematic cross-sectional view showing the heater apparatus in contact with an object.

Next, the heat transfer before and after the contact of the finger 40 is explained with reference to FIG. 7 and FIG. 8 and the mathematical equations. In FIG. 7 and FIG. 8, in order to explain the move direction of heat, the conductive part 31 and the insulated board 22 are omitted, and only the heating portion 25 and the main body 21 are shown. Moreover, in FIG. 7 and FIG. 8, the move direction of heat is shown in the arrows. Moreover, it is assumed that the back surface of the main body 21 is insulated completely.

The heat transmission amount Q1 from the heating portion 25 to the surface of the main body 21 is expressed with the following formula (1). Moreover, the heat emitting amount from the surface of the main body 21 to outside is separated into the quantity of heat by a convection and the quantity of heat by radiation. The convection heat amount Q2 is expressed with the following formula (2). The radiation heat amount Q3 is expressed with the following formula (3).

[Equation 1]

$$Q1 = \frac{\lambda 2}{t}(T1 - T2) \ [W/m^2] \tag{1}$$

$$Q2 = h(T3 - T0) \ [W/m^2] \tag{2}$$

$$Q3 = \varepsilon\sigma(T2^4 - T0^4) \ [W/m^2] \tag{3}$$

Here, the surrounding temperature is defined as T0, the temperature of the heating portion 25 is defined as T1, and the surface temperature of the main body 21 is defined as T2. T3 represents the surface temperature of the heating portion 25 before a contact. The quantity of heat (Joule heat) emitted from the heating portion 25 is defined as Q0 (W/m²). The cross-section area of the heating portion 25 is defined as A when the heating portion 25 is cut in the direction of the axis Y. The upper area of the heating portion 25 is defined as S. The heating portion 25 is defined to have a thermal conductivity λ1, and the main body 21 is defined to have a thermal conductivity λ2. The thickness between the surface of the main body 21 and the heating portion 25 is defines as t. Moreover, as coefficient, the heat transfer coefficient of a natural convection is defined as h, the radiation rate is defined as ε, and the Stephen Boltzmann constant is defined as a. The heat resistance of the heating portion 25 in the transverse direction is defined as R, the finger 40 (heat transfer coefficient of a human body) is defined as K, and the length (unit length) of the heating portion 25 is defined as l.

When the heat emitting amount Q0 of the heating portion 25 is directly transferred to the surface of the main body 21 and is emitted to outside by convection and radiation, the surface temperature T2 of the main body 21 is stabilized. In other words, at a time of Q0=Q1=Q2+Q3, T2 is stable at a point higher than or equal to a predetermined radiation temperature. For example, the radiation temperature is a predetermined temperature higher than or equal to 60° C.

Next, a case where the finger 40 contacts the surface of the main body 21 is explained. When the finger 40 contacts the surface of the main body 21, convection and radiation is at least partially barred. Moreover, at least a part of heat emitted from the surface of the main body 21 is transmitted to the finger 40 in the contact. Therefore, the contact of the finger 40 changes the thermal balance inside of the main body 21. The heat transmission amount Q1t from the heating portion 25 to the surface of the main body 21 when the finger 40 contacts is expressed with the following formula (4). Moreover, the heat absorbing amount Q4 of the finger 40 in the contact is expressed with the following formula (5). The heat transmission amount Q5 from the side (both sides) of the heating portion 25 in accordance with a lowering in the temperature of the contact portion is expressed with the following formula (6).

[Equation 2]

$$Q1t = \frac{\lambda 2}{t}(T1t - T2t) \ [W/m^2] \quad (4)$$

$$Q4 = K(T2t - T4) \ [W/m^2] \quad (5)$$

$$Q5 = 2 \times \frac{1}{R}(T2t - T3t) \ [W/m^2] \quad (6)$$

Here, the internal temperature of the finger 40 is defined as T4. The temperature of the heating portion 25 at the contact time is defined as T1$t$. The surface temperature of the main body 21 at the contact time is defined as T2$t$. The surface temperature of the heating portion 25 at the contact time is defined as T3$t$. When rated apparent power is supplied to the heater apparatus 10, a certain object (for example, finger 40) may contact a part of the surface of the main body 21. In this case, the surface temperature falls since the finger 40 in the contact transfers heat away. When the contact portion is soon thermally balanced, Q5+Q0=Q1$t$=Q4 is obtained. At this time, the heat resistance R is defined so that T2$t$ becomes lower than or equal to a predetermined control temperature. The heat resistance R is expressed with the following formula (7). The control temperature is a predetermined temperature, for example, lower than or equal to 50° C.

[Equation 3]

$$R = \frac{l}{\lambda A} \ [W/K] \quad (7)$$

The cross-sectional shape and the material of the heating portion 25 are selected so that the heat resistance R shown in the formula (7) becomes higher than or equal to a predetermined value. This is because the heat transmission amount Q5 from the side (both sides) of the heating portion 25 becomes smaller, as shown in the formula (6), when the heat resistance R becomes larger. The heat resistance R is set, for example, larger than or equal to 1000 K/W, and is preferably set as 7000 K/W. Moreover, for example, the heating portion 25 is set to have a width (diameter) smaller than 1 mm, preferably smaller than or equal to 500 micrometers, and is set to have a height less than 1 mm, preferably smaller than or equal to 100 micrometers. Thus, a heater with small heat capacity is realized by making the cross-section of the heating portion 25 thin. Thus, quick start-up also becomes possible.

As explained above, the heater apparatus 10 of this embodiment has the detecting unit 23 which detects the object around the main body 21. The control part 26 controls the power supply to the power supply part 24 based on the detection result of the detecting unit 23. Specifically, the control part 26 controls the energization of the power supply part 24 to reduce the power supply amount to the power supply part 24 compared with a usual state, when the detecting unit 23 detects an object within a predetermined range of the main body 21. In other words, when the detecting unit 23 detects an object approaching or in contact with the main body 21, the control part 26 reduces the output of the heater apparatus 10 or stops the heater apparatus 10. When an object is within the predetermined range of the main body 21, the amount of heat emitted by the heating portion 25 can be reduced compared with a usual state. Thus, the approaching object can be restricted from being heated by the heating portion 25. Therefore, while the object is close or touches, the object can be restricted from having temperature rise by the heating portion 25.

Moreover, in this embodiment, the heating portion 25 is arranged so that the plural units of the heating portion 25 are dispersed in a plane. The main body 21 is formed to surround each of the heating portions 25, and has insulation properties. A thermal conductivity of the main body 21 is lower than a thermal conductivity of the heating portion 25. Since the heating portion 25 is arranged in the distributed state, the thermal capacity is small. Moreover, each heating portion 25 is covered by the main body 21 which has thermal conductivity with low heat transfer from the circumference. Therefore, additional heat supply from the surrounding main body 21 to each heating portion 25 is controlled. For this reason, when an object is in contact with the surface of the heater apparatus 10 corresponding to each heating portion 25, it is avoided that the temperature of the portion at which the object contacts is maintained at high temperature over a long time. Therefore, when an object contacts the surface of the heater apparatus 10, the surface temperature of the heater apparatus 10 falls rapidly only at the contact portion to a temperature that is near the temperature of the object in the contact. For example, when an object contacts the surface of the heater apparatus 10, the temperature of the contact portion rapidly falls to a temperature that is a little higher than the temperature of the object, for example, about 45° C. For this reason, the temperature of the contact portion in the contact with the object is restricted from being maintained at high temperature.

Moreover, in this embodiment, the detecting unit 23 is arranged in the main body 21 with the heating portion 25. Therefore, the heating portion 25 and the detecting unit 23 can share the electrode 32. Moreover, since the detecting unit 23 and the heating portion 25 are supported by the same insulated board 22, the support component is sharable. Thus, the number of components can be reduced, such that the heater apparatus 10 can be downsized.

Furthermore, in this embodiment, the detecting unit 23 detects an object within the predetermined range of the heating portion 25 by detecting a change in electric capacitance that is caused when the object approaches the heating portion 25. Approach of object is detectable in non-contact state.

Moreover, in this embodiment, the detecting unit 23 has plural conductive parts 31 as an electrode for detecting change in electric capacitance. The cross-section area of the conductive part 31 is smaller than the cross-section area of the power supply part 24. Therefore, heat capacity of the conductive part 31 can be made smaller than that of the power supply part 24. Thus, heat of the heating portion 25 is restricted from vainly consumed by the transfer to the conductive part 31, and the amount of heat transmitted to the main body 21 is restricted from decreasing.

Furthermore, in this embodiment, the cross-section area of the heating portion 25 is smaller than the cross-section area of the power supply part 24. Since the power supply part 24 emits heat not easily compared with the heating portion 25, the electric current transmitted from the power supply part 24 is restricted from being affected by heat generated by the power supply part 24. Therefore, electric current can be efficiently supplied to the heating portion 25. Moreover, by making the heat capacity of the heating portion 25 small, the temperature fall in the heating portion 25 by the contact with an object can be facilitated. Therefore, large heat transfer to the object in the contact can be restricted.

Moreover, in this embodiment, the electric resistivity of the power supply part 24 is smaller than the electric resistivity of the heating portion 25. Since the power supply part 24 emits heat not easily compared with the heating portion 25, the electric current transmitted from the power supply part 24 is restricted from being affected by heat generated by the power supply part 24. Therefore, electric current can be efficiently supplied to the heating portion 25.

Furthermore, in this embodiment, the plural heating portions 25 are connected in parallel relative to the power supply part 24. Therefore, a predetermined output can be obtained from a predetermined power supply, for example, 12V power supply mounted on a vehicle.

Moreover, in this embodiment, the heating portion 25 and the conductive part 31 are insulated from each other. Therefore, electric current is restricted from flowing from the heating portion 25 to the conductive part 31, and is restricted from flowing to the heating portion 25 from the conductive part 31. Therefore, a predetermined electric field can be generated by the conductive part 31 by excluding the electrical influence between the conductive part 31 and the heating portion 25.

Furthermore, in this embodiment, the insulated board 22 is arranged inside the main body 21. The heating portion 25 is formed on the surface 22a of the insulated board 22, and the conductive part 31 is formed on the back surface 22b of the insulated board 22. Therefore, the heating portion 25 and the conductive part 31 can be certainly insulated from each other by the insulated board 22. Moreover, the conductive part 31 is arranged inside the main body 21 with the heating portion 25. Therefore, the heating portion 25 and the conductive part 31 can be supported by the insulated board 22. Since the heating portion 25 and the conductive part 31 are arranged inside the main body 21, a foreign substance such as garbage and dust can be restricted from adhering to the conductive part 31 or the heating portion 25. Thus, operation of the conductive part 31 and the heating portion 25 can be stabilized.

While the desirable embodiment of the present disclosure is described, the present disclosure is not restricted to the embodiment mentioned, and can be implemented with various modification in the range not deviating from the scope of the present disclosure.

The scope of the present disclosure is not limited to the range exemplified with the structure of the embodiment. The range of the present disclosure is shown by the appended claims, and also includes all the changes in the equivalence.

The detecting unit 23 is not restricted to an electric capacitance type, while the detecting unit detects change in electric capacitance to detect an object in the above-mentioned embodiment. The detecting unit may be, for example, a resistance film type, a surface acoustic wave type, an optical imaging type using infrared rays, or electromagnetic induction type.

The detecting unit may be separate from the main body 21 as another object, while the detecting unit is arranged inside the main body 21 in the above-mentioned embodiment. Moreover, the detecting unit is not restricted to a detecting unit for the heater apparatus 10 for exclusive use. For example, various kinds of sensors mounted in a vehicle such as a sensor for theft prevention may be used.

The conductive parts 31 may be arranged in a lattice state while dispersed in the plane, and is not limited to a stripe state described in the above-mentioned embodiment.

What is claimed is:

1. A heater apparatus comprising:
a power supply part to which electric power is supplied;
a main body having a heating portion connected to the power supply part to generate heat by electric power supplied from the power supply part;
an insulated board disposed inside the main body;
a detecting unit that detects an object around the main body; and
a control part that controls supply amount of the electric power to the power supply part, wherein
the control part controls the supply amount of electric power to the power supply part to be reduced compared with a normal state when the detecting unit detects that the object is within a predetermined range of the main body,
the detecting unit detects a change in electric capacitance that is caused when the object comes close to the heating portion, so as to detect that the object is within the predetermined range of the heating portion,
the detecting unit has a plurality of conductive parts as an electrode to detect the change in the electric capacitance,
the plurality of conductive parts is arranged to be dispersed in a plane,
a cross-section area of the conductive part is smaller than a cross-section area of the power supply part,
the heating portion and the conductive part are insulated from each other through the insulated board,
the heating portion is arranged on a surface of the insulated board located on one side in a thickness direction,
the conductive part is arranged on a surface of the insulated board located on the other side in the thickness direction, and
the conductive part and the heating portion are arranged inside the main body.

2. The heater apparatus according to claim 1, wherein
the heating portion is arranged to be dispersed into a plural units in a plane,
the main body is disposed to surround each of the plural units of the heating portion, and
the main body is insulated and has a thermal conductivity that is lower than a thermal conductivity of the heating portion.

3. The heater apparatus according to claim 1, wherein
a cross-section area of the heating portion is smaller than a cross-section area of the power supply part.

4. The heater apparatus according to claim 1, wherein
an electrical resistivity of the power supply part is smaller than an electrical resistivity of the heating portion.

5. The heater apparatus according to claim 2, wherein
the plural units of the heating portion are connected in parallel with the power supply part.

* * * * *